United States Patent [19]

Cousin

[11] 4,174,841
[45] Nov. 20, 1979

[54] RECORD PLAYER WITH START-STOP CONTROL BY MEANS OF A MAGNETIC FIELD

[75] Inventor: Alain Cousin, Flers, France

[73] Assignee: U.S. Philips Corporation, New York, N.Y.

[21] Appl. No.: 931,602

[22] Filed: Aug. 7, 1978

[51] Int. Cl.² ............................................. G11B 17/06
[52] U.S. Cl. .................................. 274/1 L; 274/15 R
[58] Field of Search ................................ 274/1 L, 15

[56] References Cited

U.S. PATENT DOCUMENTS

| 3,503,615 | 3/1970 | Matsuda | 274/9 R A |
| 3,599,984 | 8/1971 | Kondo | 274/1 L |

*Primary Examiner*—Charles E. Phillips
*Attorney, Agent, or Firm*—David R. Treacy

[57] ABSTRACT

A record player motor is stopped by the detection of a magnetic field related to the movement of a pick-up arm by means of a Hall-effect cell, and is started by the influence of another magnetic field acting on the same Hall effect cell. A control circuit ensures that start and stop signals supplied by the Hall-effect cell are discriminated and supplied to start and stop switches respectively.

10 Claims, 13 Drawing Figures

RECORD PLAYER WITH START-STOP CONTROL BY MEANS OF A MAGNETIC FIELD

BACKGROUND OF THE INVENTION

The invention relates to a record player comprising a turntable, a pivotable pick-up arm, which arm carries a cartridge provided with a pick-up stylus, a fixed arm support, an electric motor for driving the turntable, and a power supply to the motor using an electronic control; and more particularly to such a player whose electronic control means includes a motor stop switch, and a magnetic field generator associated with a Hall-effect detector element, movable relative to each other in conjunction with the movement of the pick-up arm, the output signal of the Hall element actuating the stop switch through a control circuit which comprises a differentiator for sensing a pivoting speed of the arm which corresponds to the pick-up stylus scanning the zone which follows after the recording area of the record.

Such a record player is described in French Patent Specification No. 1,512,054 to which U.S. Pat. No. 3,485,332 corresponds.

Without any mechanical connections or friction, it enables the turntable to be stopped when scanning of the recorded part of the record is terminated. The range in which stopping is initiated is sufficiently large to ensure that the stop zones of the different types of records available on the market are covered (for example: types with 33.3 and 45 r.p.m.; 17.25 and 30 cm diameter).

Furthermore, it is known from French Pat. No. 2,151,872 and U.S. Pat. No. 3,503,615 to differentiate an electrical variable which is related to the movements of the pick-up arm in order to discriminate between slow and rapid movements of the arm.

The known devices relate to stopping of the record player turntable, whereas starting of the turntable is controlled either automatically or by a manual displacement of the pick-up arm from its support.

Thus, in particular in the case of a non-automatic record player, a second device is needed for start control.

SUMMARY OF THE INVENTION

It is the object of the invention to employ the same position detector elements for starting and stopping of the turntable.

In accordance with the invention a magnetic field generator is also disposed so as to induce in said Hall element a start signal which is related to the position of the pick-up arm after it has been removed from its support, and the control circuit includes means for energizing the motor responsive to said start signal.

The advantage of the invention is obviously that for the two functions only a single control circuit has to be manufactured and that during assembly of the record player only one device is to be mounted on the chassis of the apparatus. Starting is effected without exerting force on the pick-up arm and without mechanical tripping.

In a preferred embodiment which enables the assembly operations to be simplified the Hall element and the control circuit are combined as one assembly fixedly mounted on the chassis, and the magnetic field generators are mounted on a plate or member which is adjustably secured to the pivoting structure of the pick-up arm, the relative position of said plate with respect to the Hall element being adjusted during assembly of the record player.

Differentiation between the two magnetic field generators which are used may be based on the strength of the field detected by the Hall element or on the order of magnitude of their rate of change, but in a preferred embodiment the magnetic field generators present opposite polarities to the Hall element.

A simple means of obtaining this embodiment is to ensure that the two magnetic poles of the same magnet are employed for inducing the motor start and stop signals in the Hall element.

These magnetic field generators may be constituted by electromagnets, the emitted field then being variable in time, which variation can be detected and utilized by the control circuit.

In a special embodiment of the invention, the two magnetic field generators are permanent magnets, or the two poles of one permanent magnet.

To simplify the device and to eliminate movable electrical connections, it is particularly advantageous to make the Hall element stationary and the magnetic field generators movable with the pick-up arm.

When magnetic Hall effect detectors are used which are generally available on the market in accordance with a preferred embodiment the Hall element is subjected to a variable magnetic field, and supplies signals which are in phase opposition at two outputs, the reversal of the polarity of the magnetic field causing the signals at the two outputs the be interchanged, these outputs being respectively connected to the motor energizing means and the motor stop switch.

In a first embodiment of the invention, in which the turntable is started by moving the arm from its support towards the center of the turntable, the two magnets are secured to the arm in such a way that in the rest position they are located on the same side of the Hall element, the movement of the arm towards the turntable first moving the start magnet past the Hall element. The means for energizing the motor include an electronic bistable trigger circuit which is included in the circuit which interconnects the Hall element and the start switch, the input of said trigger circuit being short-circuited when the motor is energized.

In a form of the control circuit which connects the magnetic detector to the electrical power supply of the record-player motor the integrated assembly includes a comparator which receives both the derivative with respect to time of the stop signal supplied by the Hall element and a reference voltage, the output of said comparator being active and allowing the motor to be energized when the derivative of the stop signal is smaller than the reference.

In this situation the energizing means includes a current source supplying the comparator, said source being controlled by the start signal which is supplied by the Hall element.

In another embodiment of the invention, in which the turntable is started by first moving the arm from its support in the direction away from the turntable, the two magnetic field generators are secured to the arm in such a way that in the rest position one is disposed on each side of the Hall element, the removal of the arm causing the start magnet to be moved in front of the Hall element, the corresponding output signal of the Hall element being directly transferred to the motor start switch.

The following description and drawings illustrate examples of the record player in accordance with the invention.

BRIEF DESCRIPTION OF THE DRAWING

FIG. 7a is a block diagram of the control circuit of a record player as illustrated in FIGS. 5a and 6a.

FIG. 10 is a detailed electronic diagram of a circuit in accordance with FIG. 7a.

DESCRIPTION OF THE PREFERRED EMBODIMENTS

Figure 1:
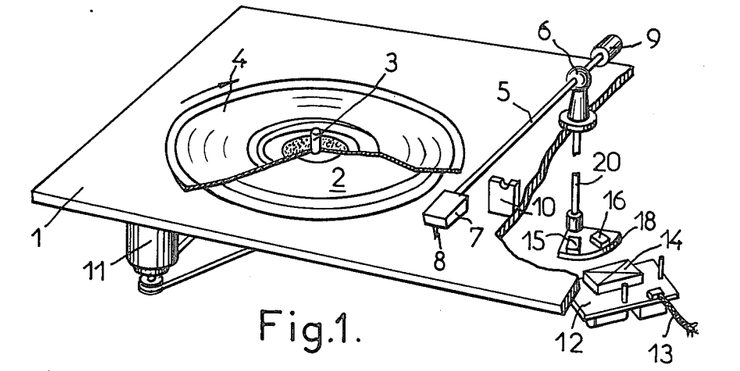
FIG. 1 is a perspective view, partly in cross-section, of a record player in accordance with the invention.

The record player which is shown in a simplified manner in FIG. 1 comprises a fixed chassis which in the example shown is substantially horizontal, accommodating:

a turntable 2 which rotates about a spindle 3, on which a phonograph record 4 is disposed.

a pick-up arm 5 which is mounted on an articulated joint 6 with two degrees of freedom, which can pivot in two planes respectively parallel and perpendicular to the turntable. At one of its ends the arm carries a pick-up head or cartridge 7 which cartridge is equipped with a pick-up stylus 8 which is adapted to scan the phonograph groove. This arrangement is balanced by a counterweight 9 at the other end of the arm.

a support 10 secured to the chassis and receiving the arm 5 when it is not desired to scan a recording.

an electric motor 11 for driving the turntable. FIG. 1 partly shows a pulley and a belt which transmit the rotation of the motor to the turntable.

at its lower part, an electric circuit assembly 12 for controlling the electric motor, energized by conductors 13.

In the present example, the control circuit comprises a Hall-effect magnetic field detector element 14 referred to as Hall element hereinafter. In this case this element is rigidly connected to the chassis.

Two permanent magnets 15 and 16 which are fixed onto a plate 18 move in front of the Hall element 14, which plate is secured to a spindle 20 which passes through the chassis. This spindle 20 is connected to the pick-up arm of the record player and pivots thereon, following the movements of the arm in the plane parallel to the turntable, in particular when the pick-up stylus 8 scans the groove of the record. For the sake of simplicity these movements are referred to as horizontal.

Figure 3:
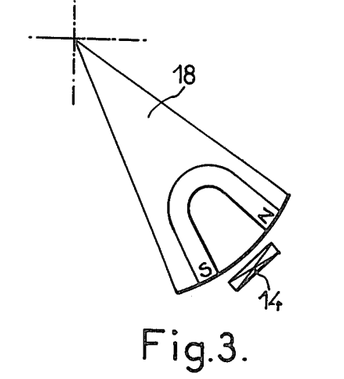
FIG. 3 schematically illustrates the use of a single curved magnet replacing the two magnets of the preceding Figure.

It is evident that the magnets 15 and 16 may be replaced by equivalent devices such as the two poles of a single curved magnet, shown in FIG. 3, or by electromagnets energized with constant or variable current, these last two arrangements moreover enabling the use of a magnetic field which varies as a function of parameters other than the "horizontal" movement of the arm.

It is also possible to reverse the position of the Hall element and the magnets, but in that case the power supply and the electrical outputs of the Hall element, which take the form of conductors, may mechanically disturb the movements of the arm.

Figure 2:
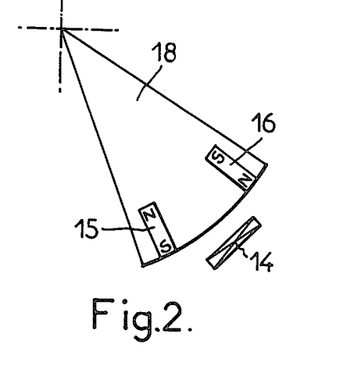
FIG. 2 schematically illustrates the location of two magnets and a Hall element.

FIG. 2 shows an example of an arrangement of the magnets 15 and 16 on the plate 18. In this case the magnets are for example glued in position and present opposite poles to the Hall element 14, N designating a north pole and S a south pole. In FIG. 3 the two opposite magnets are simply replaced by a single curved magnet, the result being the same in respect of the polarities.

Figure 4:
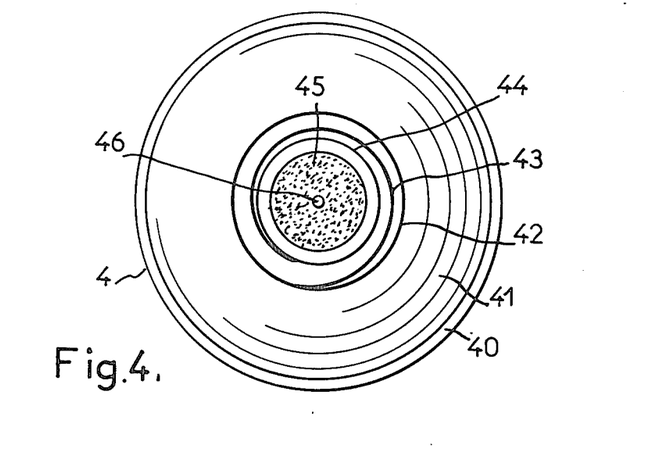
FIG. 4 shows a phonograph record and its different zones.

FIG. 4 shows a record, in particular a well-known modern microgroove record, which is destined for a standard speed of rotation of 45 or 33.3 r.p.m. On this disc 4 different areas are distinguished, which are provided or not provided with an engraved groove. From the outside towards the inside there are:

an unrecorded zone 40 where the groove is cut in widely spaced turns and which allows the pick-up stylus 8 to be rapidly guided towards the recording zone, a recording zone 41 whose last turn is designated by the reference numeral 42. The pitch in this zone is approximately 0.2 mm per revolution, an unrecorded zone where the pitch of the groove increases, at 43, in order to lead the pick-up stylus 8 rapidly from the last recording turn 42 to a closed groove in this zone 44, designated lead-out groove, which in accordance with current standards is located between diameters of 106 and 94 mm. In this zone, the pitch of the groove at 43 is at least 0.9 mm per revolution, and it may be higher than this value depending on the type of record.

These turns 43 define the so-called "sensing" zone, which is to trigger the automatic stop device of the record player. Sensing begins from a diameter of 127 mm.

For a record player destined to play modern 45 r.p.m. or 33 r.p.m. recordings the stop zone of the turntable is thus situated substantially between the diameters 127 mm and 92.5 mm. When the pick-up stylus 8 scans this stop zone and, more in particular, the part 43 of the groove, the control means should interrupt the operation of the turntable drive motor 11 and, in the case of a semi-automatic record player, lift the pick-up arm so that the stylus 8 comes clear of the record 4.

Finally, in its center, the record comprises a label 45 on which its characteristics are printed. In the record with the label a hole 46 is formed for receiving the spindle 3 of a record player turntable (FIG. 1).

Figure 5A:
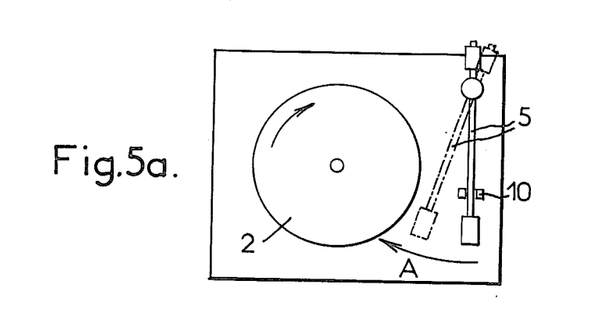
FIG. 5a, in plan view, illustrates the movement of the pick-up arm towards the turntable center.
Figure 5B:
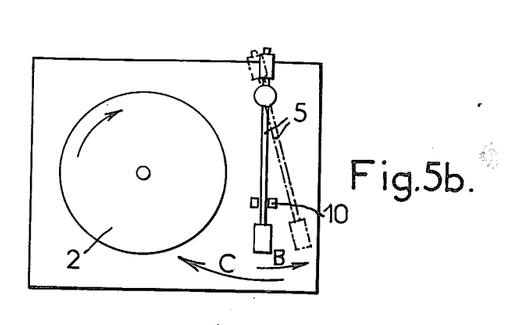
FIG. 5b, in plan view, illustrates the movement of the pick-up arm away from the turntable center.

FIGS. 5a and 5b each schematically show a record player in plan view and illustrate two methods of starting the motor of the turntable by means of the arm 5.

In these two Figures the dashed lines indicate the position of the arm in which starting is initiated.

In the record player shown in FIG. 5a starting of the turntable 2 is controlled by the user by moving the arm 5 from its support 10 towards the center of the turntable 2, in accordance with the arrow A. After starting the turntable, the user moves the arm further and puts it onto the record.

In the record player shown in FIG. 5b, starting of the turntable 2 is controlled by the user by moving the arm 5 from its support 10 in a direction away from the turntable, in accordance with the arrow B. When the turntable rotates, the arm 5 is moved towards said turntable, in accordance with the arrow C, so as to be put onto to the record.

Figure 6A:
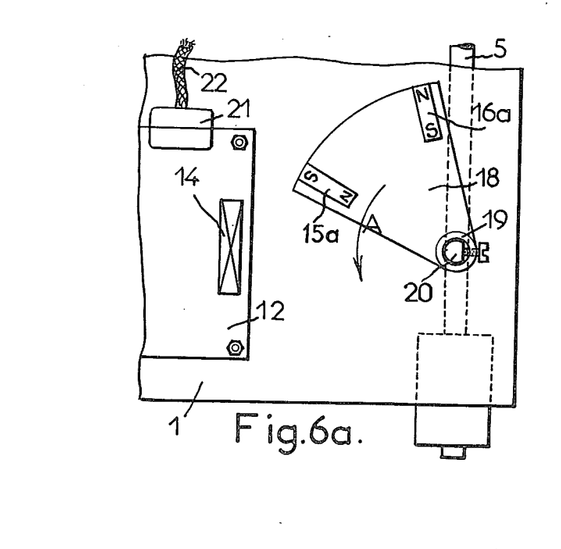
FIG. 6a is a bottom view of the chassis of the record player of FIG. 5a, showing the arrangement of the magnets.
Figure 6B:
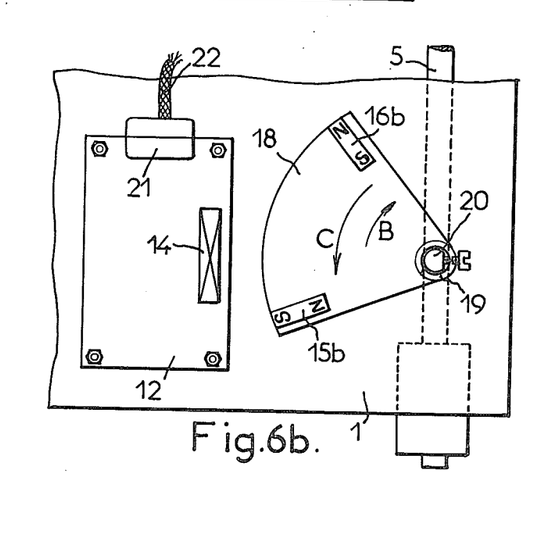
FIG. 6b is a bottom view of the chassis of the record player of FIG. 5b, showing the arrangement of the magnets.

FIGS. 6a and 6b show the chassis of the record players of FIGS. 5a and 5b respectively viewed from underneath, the parts which are common to the two types bearing the same reference numerals used in the preceding figures.

The control assembly 12 is secured to the chassis 1 by means of screws and spacers. It is connected to the motor and to the electrical power supply by a connector 21 and conductors 22.

By means of a ring 19 the plate 18 carrying the magnets 15 and 16 of opposite polarity is secured to the spindle 20 (FIG. 1), which is rigidly connected to the arm and allows horizontal movements. To secure the ring 19 to the spindle 20, these two elements may be provided with a flat part and are secured to each other by means of a screw which bears against said flat part. It is thus possible to obtain a correct angular position of the plate 18 relative to the arm 5 during assembly of the apparatus. Alternatively, steps may be taken to ensure that the flat part of the spindle 20 terminates in a shoulder which serves as axial locating stop for the ring 19.

FIGS. 6a and 6b show the plate 18 in the rest position, the arm being placed on its support (reference numeral 10 in FIGS. 5a and 5b).

FIG. 6a concerns the record player whose operation is explained by means of FIG. 5a. The magnets 15 and 16 are designated 15a and 16a in this particular case. The plate 18 is so adjusted relative to the pick up arm that, in the rest position with the arm being disposed on its support 10 (FIG. 1), the two magnets 15a and 16a are situated on the same side of the Hall element 14. As the arm is moved towards the center of the record, in accordance with the arrow A (FIGS. 5a and 6a) the magnets 15a and subsequently 16a consecutively pass by the Hall element.

The magnet 15a corresponds to starting of the turntable, the magnet 16a to stopping. The angular position of the start magnet 15a is such that during its movement in accordance with the arrow A, it passes the Hall element before the pick-up arm 5 reaches the record which is placed on the turntable.

The angular position of the stop magnet 15b is such that it passes the Hall element 14 when the pick-up stylus scans the turn 43 of a record (FIG. 4), in the stop zone after the recorded area of the record.

FIG. 6b relates to the record player whose operation is explained by means of FIG. 5b. In this second special case the magnets 15 and 16 are designated 15b and 16b. Relative to the pick-up arm the plate 18 is adjusted in such a way that, in the rest position with the arm being on its support, the two magnets 15b and 16b are situated one on each side of the Hall element 14. By first moving the pick-up arm in a direction away from the record in accordance with the arrow B, the magnet 15b, which corresponds to starting of the turntable, is positioned in front of the Hall element. By returning the arm towards the centre of the record, in accordance with the arrow C, the magnet 16b corresponding to stopping of the turntable, is subsequently brought in front of the Hall element.

The angular positions of the magnets 15b and 16b relative to the pick-up arm are determined so that the same results are obtained as with the positions of the magnets 15a and 16a described with reference to FIG. 6a.

Figure 7A:
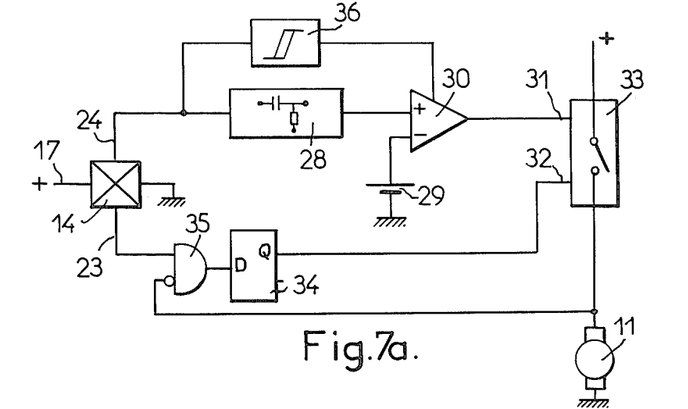

FIG. 7a is an example of a diagram of the control circuit of the turntable drive motor; the circuit shown is destined for a record player of the type illustrated by FIGS. 5a and 6a.

The Hall-effect element 14 is connected to a d.c. power supply 17. Its two outputs 23 and 24 supply signals of opposite phase. Reversal of the magnet field applied to the Hall element results in an interchange of the signals available at the two outputs 23 and 24.

In the example of FIGS. 5a, 6a, 7a a magnetic NORTH polarity (magnet 16a) results in a signal at the output 24 which is processed by the part of the control circuit for stopping the record player. A magnetic SOUTH polarity (magnet 15a) only influences the part of the control circuit for starting the record player via the output 23.

The signal from the output 24 is subsequently processed in a differentiation circuit 28 and the differentiated signal is compared with a reference 29 in a comparator 30 whose output is connected to the "stop" control 31 of the switch 33 which is included in the power supply to the motor 11.

The signal from the output 23 is applied to the "start" control 32 of the sleeve 33 via a D-type bistable 34. The input to the bistable is blocked when the motor functions. A logic "AND" circuit whose input is inverted can only supply a signal to the bistable when the Hall element is activated by a SOUTH magnet (example of FIGS. 6a, 7a) and when the motor is inoperative.

Figures 8, 9:
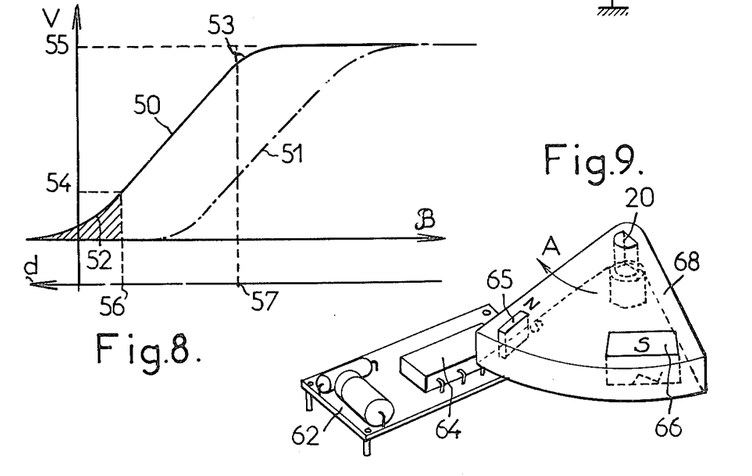
FIG. 8 is a diagram showing the variation of the voltage V across the Hall element as a function of the applied magnetic field strength B.
FIG. 9 shows a special arrangement of the control circuit and the magnets.

In FIG. 8 the variation of the output voltage of the Hall element, as an absolute value, is plotted against the variation of the strength of the magnetic field B which is plotted on the horizontal axis.

The curve representing the variation $V=f(B)$ exhibits a linear portion 50 and two curved portions 52 and 53. As the field strength increases, the output voltage tends to assume a saturation value 55.

The position of the magnet 16a (FIG. 6a) relative to the pick-up arm should be such that when the arm reaches the stop area of a record (FIG. 4), the voltage induced in the Hall-element by the magnet varies in a substantially linear manner as a function of the applied magnetic field (part 50 of the curve in FIG. 8), that is, of the angular position of the magnet and the arm. The horizontal axis of the diagram in FIG. 8 may also be graduated in accordance with the diameter "d" which characterizes the position of the pick-up stylus. On this axis the diameters "d" increase in a direction opposite to the field B. The linear part of the curve $V=f(d)$ should correspond to scanning of the stop area of the record, that is, it should begin at the diameter designated 56, d=127 mm, and extend up to at least the diameter designated 57, d=94 mm.

Apart from the mechanical adjustment as described with reference to FIG. 6a, it is possible to adjust the position of the curve 50 electrically by influencing the balance of the output voltages of the Hall element. Thus, a translation of the curve 50 towards position 51 represented by a dash-dot line can be obtained, or it can be translated in the opposite direction.

For a correct operation of the circuit of FIG. 7a it is important to eliminate the non-linear portion 52 of the curve 50, which is achieved by controlling the comparator 30 by means of a circuit 36 which is generally referred to as a "Schmitt trigger", which receives the signal from the output 24. The comparator supplies no signal when the input of the trigger circuit 36, which is also the input of the differentiator 28, has a voltage value which is smaller than the value 54 indicated in FIG. 8.

The record player shown in FIGS. 5a, 6a and 7a operates as follows: Starting from the rest position, the pick-up arm is disengaged from its support 10 and moved by the user towards the turntable and the record to be played, in accordance with the arrow A. First of all, the magnet 15a passes the Hall element 14. Its south pole induces a positive electrical signal which appears at the output 23 of the Hall element. The pulse resulting from the passage of the magnet 15a is transferred to the D input of the multivibrator 34 via the AND-gate 35 which is open because the motor is inoperative. The Q output of the multivibrator, which is in the preferred passive state upon energization, becomes active and the start signal is transferred to the "start" input 32 of the switch 33. The motor is energized, the turntable rotates, and the pick-up stylus can be placed on the record. The AND-gate 35 prevents any change of state of the multivibrator during operation of the motor.

At the end of the recording, near the stop zone 44 of the record (FIG. 4) the magnet 16a comes in the proximity of the Hall element. Its north pole induces a positive signal which is available at the output 24 and which is differentiated with respect to time by the differentiator 28. The output of this differentiator is a voltage which is proportional to the speed of movement of the magnet and thus of the arm, if the non-linear portion of the curve $V=f(B)$ has been eliminated. This speed is compared with a preset value which is provided by the voltage source 29. When the pick-up stylus reaches the turn 44 of the record, the speed of movement of the arm increases, exceeding the preset value, so that the comparator 30 supplies a signal and actuates the "stop" input of the switch 33. The motor 11 is no longer energized and the record is stopped. The input of the multivibrator 34 is clear.

The pick-up arm is then lifted and returned to its support, either manually or automatically. Before the rest position is reached, the magnet 15a again passes the Hall element.

A pulse which is then produced at the output 23 of the Hall-element is transferred to the multivibrator 34 whose Q output becomes passive again. The switch 33 then remains in the stop position.

The cycle is repeated upon the next removal of the arm from its support.

FIGS. 5b and 6b show, as described previously, a record player in which the motor is started by first moving the arm away from the turntable.

Although the operation is more complex than that of a record player in accordance with FIGS. 5a and 6a, a simplification is obtained because when the arm is returned from the end of a record to its support the magnet 15b does not pass the Hall element again. Consequently, there is no undesired starting pulse upon the return of the arm. This simplification makes it possible to design a control circuit in which the output 23 of the Hall element is connected directly, via an amplifier, to the "start" input 32 of the switch 33.

Figure 7B:
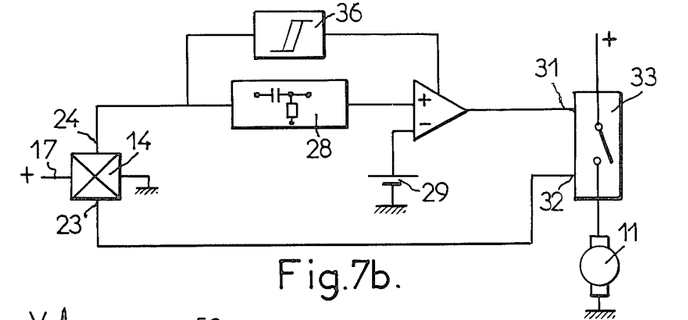
FIG. 7b is a block diagram of the control circuit of a record player as illustrated in FIGS. 5b and 6b.

Such a circuit is shown in FIG. 7b.

The method of operation of a record player in accordance with FIGS. 5b, 6b, 7b, in particular stop control by detection of the arm speed, is identical to that of the record player of FIGS. 5a, 6a, 7a.

FIG. 9 shows a special version of the magnet/control circuit assembly. In this example the Hall element is included in an integrated circuit 64 which is mounted on a printed circuit 62 which is secured to the chassis, and on which the components of the control circuit which cannot be integrated, for example the differentiation capacitance, are also accommodated. These form an integrated assembly. The start magnet 65 and the stop magnet 66 describe a path which causes them to pass over (or underneath) the Hall element. For this purpose the two magnets are included in a circular section 68 secured to the spindle 20 which is rigidly connected to the pick-up arm. The circular section 68 is for example made of a molded plastic substance. As the magnets move in a plane which is situated above (or underneath) the Hall element, their north-south poles should be shifted vertically.

In the example shown, the start magnet 65 is narrow relative to the width of the integrated circuit containing the Hall element. Its dimension in the direction of the arrow A representing its travel can only be 2 mm. It is important that the turntable of the record player is started in an exact position of the pick-up arm. However, the stop magnet 66 is much larger: its dimension in the direction of the arrow A may for example be 10 mm.

The plane traversed by the effective surfaces of the magnets is approximately 8 mm away from the plane in which the Hall-effect detector is disposed.

Figure 10:
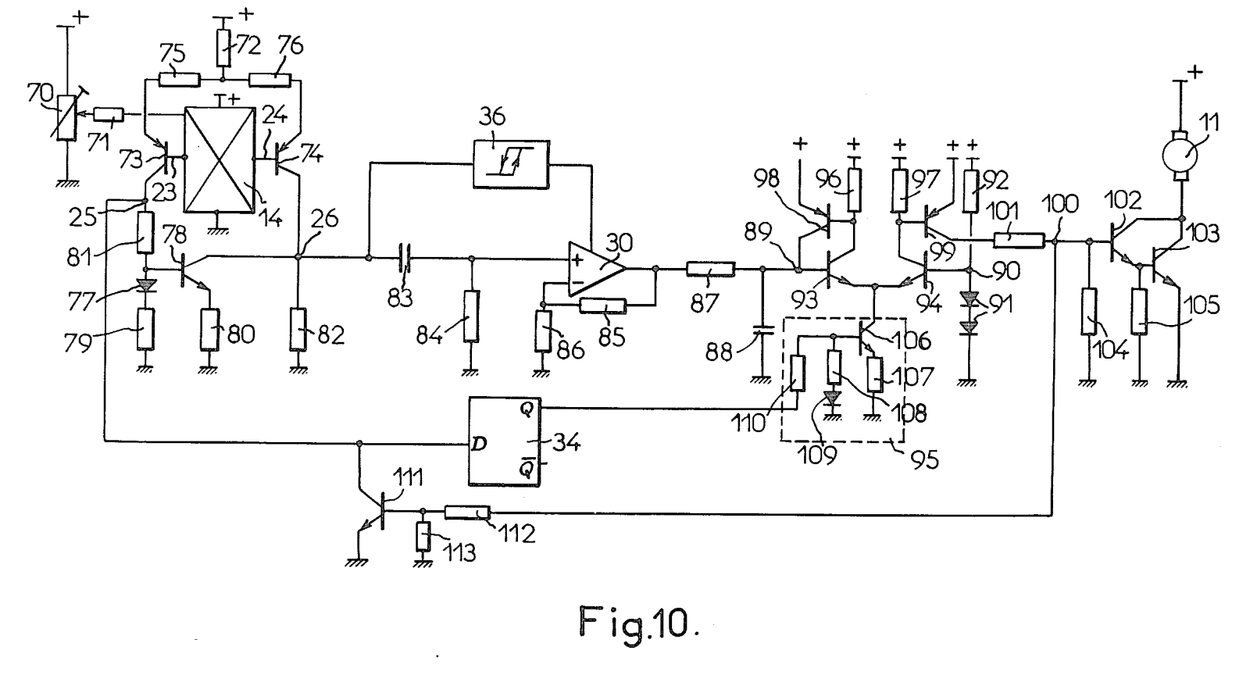

FIG. 10 shows an example of a control circuit which employs discrete or partly integrated elements. Obviously, it is possible to design the device in the form of a completely integrated circuit, except for adjustable or too bulky elements (in particular the capacitance of the differentiator).

The circuit shown is a practical example of the circuit diagram of FIG. 7a. It has been designed for use in record players operating as indicated in FIGS. 5a and 6a.

The Hall effect magnetic field detector element 14 has two outputs 23 and 24 of different phase, whose balance is adjusted with the aid of the potentiometer 70, in series with the resistor 71, so that normally the voltages available at 23 and 24 are equal, in the absence of a magnetic field which influences the detector. The signals available at 23 and 24 are applied to 25 and 26 of the control circuit via a differential amplifier which introduces an asymmetry between the supplied voltages.

For this purpose the outputs 23 and 24 are respectively connected to the bases of the two PNP-transistors 73 and 74, whose emitters are supplied via the resistors 75 and 76 from a common point which is connected to the positive source of the circuit via the resistor 72. The collectors of the transistors 73, 74 lead to a circuit of a type which is generally referred to as a "current mirror", which ensures a perfect symmetry of the collector currents. The collector of the transistor 73 drives a series connection of a diode 77 and a resistor 79, while the collector of the transistor 74 is connected to a resistor 80 of the same value as 79, via the collector emitter path of a transistor 78. The base of the last-mentioned transistor is driven by the anode voltage of the diode 77. Preferably, the diode 77 is formed by a transistor which is identical to 78, whose base and collector have been short-circuited. Under these conditions, the currents in the branches 73-77-79 and 74-78-80 are identical. A resistor 81 is included in the branch 73-77-79, after the diode 77 and thus enables a difference in voltage between points 25 and 26 to be eliminated.

In the rest position, the Hall element not being influenced by any field, the voltages at 23 and 24 are for example 5 V for a supply voltage of 6 V. As the voltage at 26 is substantially zero, the resistance values of the differential amplifier should for example be chosen so that the voltage at 25 is approximately 3 V.

A north pole of a magnet facing the Hall element for example results in a decrease of the voltage at 24 and an increase at 23. As the transistor 73 is turned off, no signal is available at 25. As the transistor 74 is conducting, the voltage at 26 increases for example from 0 to 5 V. This voltage is available across the resistor 82, whose value is high relative to those of the resistors 79 and 80, and constitutes the stop signal for the record player.

The branch of the circuit connected to 26 serves for stopping the motor. As explained with reference to FIG. 7a, the signal available at 26 is differentiated with respect to time by means of the differentiator formed by the capacitance 83 and the resistance 84. The differentiated signal is amplified in the amplifier 30 whose gain is determined by the ratio of the resistance 85 and 86. The operation of the amplifier 30 is controlled by the "Schmitt trigger" 36 by means of a stop signal at 26 which exceeds the voltage 54 indicated in the diagram of FIG. 8. Above this voltage 54 the amplifier 30 supplies no information at all. The amplified signal passes through a low-pass filter (resistor 87, capacitance 88) which is destined to eliminate spurious signals and ripple on the supply voltage of the circuit. The filtered signal is subsequently applied to the input 89 of a comparator which also receives a reference voltage at 90, which reference voltage is determined by the threshold of the two diodes 91 which in series with the resistor 92 are connected to the power supply of the circuit. In this comparator the two voltages to be compared are applied to the bases of the two NPN transistors whose emitters are connected to a common current injector 95. The collectors of these two transistors are connected to the positive supply of the circuit via the resistors 96, 97. PNP transistor 98 is connected to the NPN transistor 93 with which it forms a combination that can be latched, operating as a thyristor whose control electrode 89 receives the stop signal to be compared with the reference.

The base of a PNP transistor 99 is connected to the collector of the transistor 94, the emitter of said transistor 99 being at the supply voltage of the circuit and the collector constituting the output 100 of the comparator, via a resistor 101.

Assuming that the current injector 95 is active, the comparator operates as follows. In the absence of a signal at 89, or when the signal is below the trigger level, the transistor pair 93-98 is cut off and the transistor 94 is conductive. The transistor 99 is conductive. At point 100 a voltage appears. When the signal at 89 exceeds the threshold, the transistor pair 93-98 is latched in the conductive state, and can be latched only by the termination of the power supply by the current injector 95. The transistor 94 cuts off and as a result the transistor 99 is also turned off. Point 100 is no longer energized.

To point 100 a switch is connected which comprises two NPN transistors 102 and 103 which are biassed by the resistors 104 and 105, said switch being connected in series with the electrical power supply of the motor 11 of the record player.

The second branch of the control circuit serves for transferring the start signal supplied by the Hall-effect cell 14. This starting signal is applied to point 25 when for example the south pole of a magnet produces a voltage at the output 23 of the Hall element which voltage decreases relative to the balanced state. Referring to the example given hereinbefore, the start signal corresponds to a voltage which exceeds 3 V at 25.

This start signal is applied to the D input of a D-type bistable 34 of which only the direct Q output is utilised. The bistable is activated only above a threshold of for example 3 V. The Q-output controls the turn-on or turn-off of the current injector 95. The injector is constituted by an NPN transistor 106 which is connected to a resistor 107 and whose current is controlled by the Q-output of the bistable 34 which is connected to a resistor 108, which is identical to 107, and a diode 109, preferably constituted by a transistor which is identical to 106, with short-circuited base and collector. The current injector is connected to the Q-output of the bistable via a resistor 110. The D-input of the bistable may be short-circuited to earth by a switch which is connected in parallel with the motor supply switch 11. This switch is an NPN-transistor 111, whose base is driven by the voltage at point 100 which is applied via the resistor bridge 112, 113.

The operation of the control circuit just described is as follows. When the pick-up arm of the record player in accordance with FIGS. 5a and 6a is on the support, the motor is stopped. When the circuit is energized, the multivibrator 34 assumes a preferred state in which the Q-output is passive. The current injector 95 is consequently also passive. The output voltage of the comparator, at 100, is zero. The D-input of the multivibrator is not short-circuited.

By moving the arm towards the record the user causes the start magnet (south pole for example) to pass in front of the Hall cell. At 25 a signal appears and the multivibrator 34 changes over, so that its Q-output allows the current injector 95 to become operative. In the absence of a stop signal, the output 100 of the comparator is energized, the motor 11 is energized and the D-input of the multivibrator is short-circuited. The multivibrator can no longer change over.

When scanning of the record has been terminated, the pick-up stylus reaching the stop groove 44 (FIG. 4), the stop magnet (north pole) approaches the Hall-effect cell and a signal appears at 26. The more rapid movement of the arm causes a voltage exceeding the reference 90 to appear at 89 (rate of change of the voltage at 26). The output 100 of the comparator is latched in the passive state. The motor is no longer energized. The D-input of the multivibrator 34 is no longer blocked. The user can return the pick-up arm to its support. During this operation, the start magnet (south pole) again passes the Hall element 14 thus inducing an undesired start signal in 25. This signal is applied to the D-input of the multivibrator which changes over: the Q-output is no longer energized. The current injector 95 becomes passive, the latched state of the comparator (transistors 93-98) is attained. This has no effect on the output 100 of the comparator which was already inactive.

The pick-up arm is placed on its support. A new cycle can be initiated.

It is to be noted that if during reading of a record the user wishes to stop the record player, the arm may be lifted and moved towards the record center, so as to initiate a stop process. In the circuit described hereinbefore, it is alternatively possible to provide a manual control which enables a voltage to be applied to point 89 which suffices to change-over the comparator, thus simulating the supply of a stop signal by the Hall element.

The following list of discrete components used for realizing a control circuit in accordance with FIG. 10 is given by way of example, for a hypothetical case in which the supply voltage is +6 V.

| | | |
|---|---|---|
| Transistors | | |
| | no. 73, 74, 98, 99 | BC 558 A |
| | no. 78, 93, 94, 102, 106, 111 | BC 548 A |
| | no. 103 | BC 337 |
| Diodes | no. 91 | BA 314 |
| | no. 77, 109 | transistor |
| | with short-circuited collector-base | BC 548 |
| Resistors | no. 70 (potentiometer) | 1 k ohm |
| | no. 71 | 500 k ohms |
| | no. 72 | 1.2 k ohms |
| | no. 75, 76, 112 | 3.3 k ohms |
| | no. 79, 80, 86, 107, 108 | 1 k ohm |
| | no. 81, 92, 96, 97, 104, 110, 113 | 6.8 k ohms |
| | no. 82 | 33 k ohms |
| | no. 84 | 1 M ohm |
| | no. 85 | 20 k ohms |
| | no. 87 | 27 k ohms |
| | no. 101 | 3.9 k ohms |
| | no. 105 | 680 ohms |
| Capacitors | | |
| | no. 85 | 0.47 μF |
| | no. 88 | 0.1 μF |
| Integrated circuits | | |
| | no. 14 | TCA 450 A |
| | no. 36 | SN 7413 |
| | no. 30 | μA 741 |
| | no. 34 | SN 7474 |

What is claimed is:

1. A record player comprising a chassis; a turntable, a pivotable pick-up arm assembly having a cartridge and pick-up sytlus mounted thereon, a fixed arm support, and an electric motor for driving the turntable, mounted on the chassis; means for supplying power to the motor, including control means comprising a motor-stop switch, a first magnetic field generator associated with a Hall-effect detector element movable relative to each other in conjunction with the pivoting movement of the pick-up arm to generate an output stop signal, and a circuit for actuating the stop switch in response to the output stop signal supplied by the Hall element, said circuit including a differentiator for sensing a pivoting speed of the arm which corresponds to the pick-up stylus scanning the zone which follows after the recording area of a record, wherein said Hall element is combined with said circuit as an integrated assembly fixedly mounted on the chassis, and the player comprises a member adjustably secured to a pivoting structure of the pick-up arm assembly, said first magnetic field generator being mounted on the member; and a second magnetic field element mounted on the member for inducing in said Hall element a start signal which is related to the position of the pick-up arm which has been moved from its support, said circuit including means for energizing the motor responsive to said start signal.

2. A record player as claimed in claim 1 wherein said first and second magnetic field generators present opposite polarities to the Hall element.

3. A record player as claimed in claim 2, wherein the two magnetic field generators are poles of one magnetic element.

4. A record player as claimed in claim 3 wherein said magnetic element is a permanent magnet.

5. A record player as claimed in claim 2 in which the turntable is started by moving the arm from its support towards the center of the turntable, wherein two magnetic field generators are arranged such that in a rest position of the arm they are located on the same side of the Hall element, the movement of the arm towards the turntable first moving the second generator past the Hall element; said means for energizing the motor including an electronic bistable trigger circuit in a circuit which interconnects the Hall element and a start switch, the input of said trigger circuit being short-circuited when the motor is energized.

6. A record player as claimed in claim 2 in which the turntable is started by first moving the arm from its support in the direction away from the turntable, wherein the two magnetic field generators are arranged such that in a rest position of the arm one generator is disposed on each side of the Hall element, moving the arm from the support in the direction away from the turntable causing the start magnet to be moved in front of the Hall element, the corresponding output signal of the Hall element being directly transferred to the motor start switch.

7. A record player as claimed in claim 1 wherein the two magnetic field generators are permanent magnets.

8. A record player as claimed in claim 1 wherein the Hall element is subjected to a variable magnetic field and supplies signals of opposite phase at two outputs, the reversal of the polarity of the magnetic field causing the signals at the two outputs to be interchanged, these outputs being respectively connected to the stop switch and to the start switch of the motor.

9. A record player as claimed in claim 1 wherein said integrated assembly includes a comparator which receives both the derivative with respect to time of the stop signal supplied by the Hall element, and a reference voltage, the output of said comparator being active and allowing the motor to be energized when the derivative of the stop signal is smaller than the reference.

10. A record player as claimed in claim 9, wherein the means for energizing includes a current source supplying the comparator, said source being controlled by the start signal supplied by the Hall element.

* * * * *